UNITED STATES PATENT OFFICE.

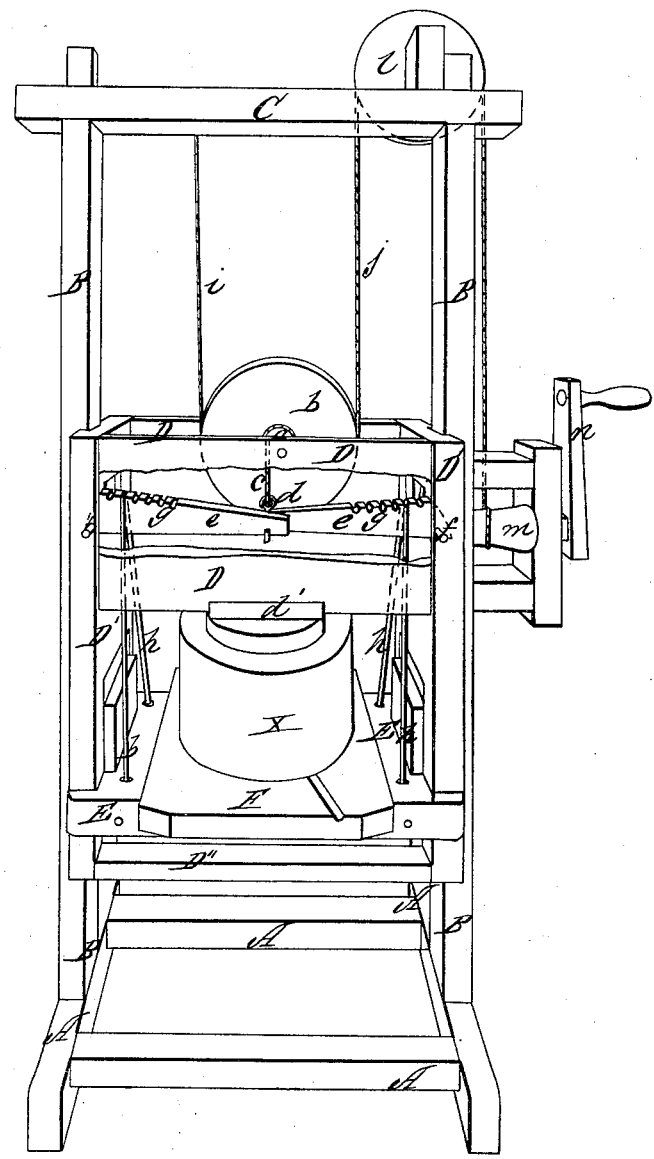

ADIN GAUNTT, OF SPRINGFIELD, NEW JERSEY.

CHEESE-PRESS.

Specification of Letters Patent No. 1,218, dated July 6, 1839.

*To all whom it may concern:*

Be it known that I, ADIN GAUNTT, of Springfield, in the county of Burlington and State of New Jersey, have invented a new and useful Improvement in Presses Used for Pressing Cheese and other Substances, and that the following is a full and exact description thereof, reference being had to the drawing accompanying and making part of this specification.

The novelty of my invention consists in pressing by the gravity of the substance, and the sliding frame that contains the substance to be pressed.

A, in the accompanying drawing, represents a platform that supports the machinery; to its sides are attached two posts B, that project upward about six feet, for an ordinary sized cheese press, and their upper ends are connected to a transverse piece of timber $c$, which secures them in a parallel position, in width about one-third the height of the machine.

The sliding frame, which contains the material to be pressed, is a little longer than the distance between the posts B, and in width sufficient to receive the levers and pulleys within the side or longitudinal pieces D, which are secured to the upper part of the posts or end pieces D', near their edges, and at the bottom of the posts, D', are other longitudinal pieces D'', for giving strength to the frame.

In the drawing accompanying an opening is represented in the front piece of the sliding-frame, to exhibit the levers and their appendages contained therein.

The sliding frame is secured within the frame of the machine, by grooves formed in the outer face of the end pieces D', corresponding with the inner face of the posts, B, of the frame of the machine, and of a depth sufficient to confine them to the posts when placed within the grooves. The posts B, serve as guides or ways for the sliding frame, in its upward and downward movement.

Transversely near the center of the pieces D, is placed a small cylinder $a$, its axis is a little below the top of the frame, and the length of the cylinder $a$'s radius, one side of the center, that the cord or chain $c$ that winds on the cylinder and connects with the levers below may be equidistant between ends D'. To the back end of the cylinder $a$, is attached a large pulley $b$, about six times the diameter of the cylinder $a$. Beneath the cylinder $a$, and connected to it by the cord $c$ and hooks $d$, are two levers $e$, and their fulcrums $f$, are within the end pieces D', at opposite sides of the frame, at or near the under edge of the levers. At the upper edge of the levers at the fulcrum end, are formed several notches $g$, at different distances from the end to graduate the suspending rods $h$, to different degrees of pressure and motion.

By placing the suspending rods $h$, near the fulcrum of the levers, pressure is increased and motion decreased and vice versa, by placing the rods $h$ farther from the fulcrum. The suspending rods being connected to the levers above the fulcrum, consequently as the inner ends of the levers move upward, the upper edge of the levers at the fulcrum end move upward and back, thereby increasing the pressure as the movable frame descends. The suspending rods $h$, are connected at their lower ends, to a movable platform E, which is supported and moved by the rods $h$. Connected to the under edge of the pieces D is a cross or transverse piece of timber $d'$, against which the follower or upper surface of the substance to be pressed rests.

In the operation of pressing the material to be solidified is placed upon the platform E, or a temporary platform F resting thereon, when the sliding frame is in its upper position, and the inner ends of the levers in their lower position as connected with the sliding frame; the material being firmly secured between the timber $d'$, and the platform, the sliding frame descends, and puts in motion the large pulley $b$, by means of the cord $i$, that is connected to the transverse timber $c$, and unwinds from and gives motion to, the pulley $b$; at the same time, winding the cord $c$, upon the cylinder $a$, raising the inner ends of the levers $e$, connecting rods $h$ and platform E, producing a pressure varying from 20 to 100 times the heft of the sliding frame and its contents, which may be increased or diminished, by giving greater or less variation to the pulley $b$, and cylinder $a$. Opposite the cord $i$, and connected with the pulley $b$ is another cord $j$, passing over a sheave $l$, placed at top of the machine, and passes down on the outside of the frame, and is wound upon a cylinder or windlass *m*, when the sliding frame is required to be raised by turning the crank *n*.

What I claim as my invention and desire to secure by Letters Patent is—

5   The cylinder *a*, pulley *b*, levers *e*, rods *h*, and platform E, connected and combined, and in combination with the sliding frame, in the manner and for the purpose as herein set forth and described.

ADIN GAUNTT.

Witnesses:
   JAMES SLOAN,
   JOSIAH EVANS.